US011551241B1

(12) United States Patent
Figueroa et al.

(10) Patent No.: US 11,551,241 B1
(45) Date of Patent: Jan. 10, 2023

(54) SYSTEMS AND METHODS FOR DIGITAL SHELF DISPLAY

(71) Applicant: Gradient Technologies, Inc., Seattle, WA (US)

(72) Inventors: Roberto Figueroa, Seattle, WA (US); Norman Shi, Los Altos, CA (US); Geoffrey Coco, Seattle, WA (US); David Copeland, Portland, OR (US)

(73) Assignee: Gradient Technologies, Inc., Seattle, WA (US)

( * ) Notice: Subject to any disclaimer, the term of this patent is extended or adjusted under 35 U.S.C. 154(b) by 0 days.

(21) Appl. No.: 17/006,427

(22) Filed: Aug. 28, 2020

Related U.S. Application Data

(60) Provisional application No. 62/896,390, filed on Sep. 5, 2019.

(51) Int. Cl.
| | | |
|---|---|---|
| *G06Q 10/00* | (2012.01) | |
| *G06Q 30/02* | (2012.01) | |
| *G06N 20/00* | (2019.01) | |
| *G06Q 30/06* | (2012.01) | |
| *G06Q 10/06* | (2012.01) | |

(52) U.S. Cl.
CPC ......... *G06Q 30/0201* (2013.01); *G06N 20/00* (2019.01); *G06Q 10/06395* (2013.01); *G06Q 30/0205* (2013.01); *G06Q 30/0206* (2013.01); *G06Q 30/0282* (2013.01); *G06Q 30/0623* (2013.01)

(58) Field of Classification Search
None
See application file for complete search history.

(56) References Cited

U.S. PATENT DOCUMENTS

| 11,068,919 | B2* | 7/2021 | Palmer | G06Q 30/0206 |
|---|---|---|---|---|
| 2009/0164403 | A1* | 6/2009 | Jung | G06N 5/02 |
| | | | | 706/46 |
| 2012/0164613 | A1* | 6/2012 | Jung | G06Q 30/0201 |
| | | | | 434/236 |
| 2012/0316793 | A1* | 12/2012 | Jung | A61B 5/16 |
| | | | | 702/19 |
| 2013/0185127 | A1* | 7/2013 | Roden | G06Q 30/02 |
| | | | | 705/14.19 |

(Continued)

OTHER PUBLICATIONS

Murray, Chase, Joint Optimization of Product Price, Display Orientation and Shelf-Space Allocation in Retail Category Management, 2010, Journal of Retailing, 86 (Feb. 2010), 125-136. (Year: 2010).*

(Continued)

*Primary Examiner* — Joseph M Waesco
(74) *Attorney, Agent, or Firm* — Wilson Sonsini Goodrich & Rosati

(57) ABSTRACT

The present disclosure provides methods and systems for quantifying item performance in a digital shelf. A method for quantifying item performance in a digital shelf may comprise: calculating a value associated with a shelf share of the given item; determining a set of factors for calculating a score indicative of the item performance on the digital shelf, wherein the set of factors includes the shelf share; generating, using a trained machine learning algorithm, the score based on the set of factors; and displaying the score within a graphical user interface (GUI) on an electronic device.

20 Claims, 10 Drawing Sheets

(56) References Cited

U.S. PATENT DOCUMENTS

| | | | |
|---|---|---|---|
| 2014/0100944 A1 | 4/2014 | Zhu et al. | |
| 2014/0280316 A1* | 9/2014 | Ganick | H04W 4/029 |
| | | | 707/769 |
| 2015/0016712 A1* | 1/2015 | Rhoads | G06V 10/751 |
| | | | 707/769 |
| 2017/0358009 A1 | 12/2017 | Shah et al. | |
| 2018/0174188 A1* | 6/2018 | Wilkinson | G06Q 30/0242 |
| 2018/0374567 A1* | 12/2018 | Toumazou | G16H 20/60 |
| 2019/0108561 A1* | 4/2019 | Shivashankar | G06F 17/18 |
| 2019/0172575 A1* | 6/2019 | Reddy | G09B 19/0092 |
| 2019/0213545 A1* | 7/2019 | Adato | G06Q 50/28 |
| 2019/0220494 A1* | 7/2019 | Naqvi | G06F 16/29 |
| 2019/0236531 A1* | 8/2019 | Adato | G06Q 10/0633 |
| 2019/0244436 A1* | 8/2019 | Stansell | G06T 19/20 |
| 2020/0019754 A1* | 1/2020 | Adato | G06T 7/13 |
| 2020/0134641 A1* | 4/2020 | Morgan | G06Q 10/06315 |
| 2020/0151421 A1* | 5/2020 | Adato | G06F 16/23 |
| 2020/0210923 A1* | 7/2020 | Palmer | G06Q 10/04 |
| 2020/0226508 A1* | 7/2020 | Louis van den Briel | |
| | | | G06N 5/046 |
| 2020/0279008 A1* | 9/2020 | Jain | G06F 16/954 |
| 2020/0285977 A1* | 9/2020 | Brebner | G06N 5/04 |
| 2020/0364730 A1* | 11/2020 | Garel | G06Q 30/0201 |
| 2020/0410426 A1* | 12/2020 | Palmer | G06Q 10/06393 |
| 2021/0012577 A1* | 1/2021 | Stansell | G06Q 30/0631 |
| 2021/0042502 A1* | 2/2021 | Adato | G06T 7/75 |
| 2021/0157312 A1* | 5/2021 | Celia | G05B 23/0286 |
| 2021/0166025 A1* | 6/2021 | Wang | G06Q 30/0271 |
| 2021/0201263 A1* | 7/2021 | Glaser | G06Q 30/0641 |
| 2021/0272086 A1* | 9/2021 | Buibas | G06Q 30/06 |
| 2021/0297770 A1* | 9/2021 | Wexler | H04R 1/326 |

OTHER PUBLICATIONS

Zhang, et al., Optimal real-time bidding for display advertising. Conference Paper; Aug. 2014. http://dx.doi.org/10.1145/2623330.2623633.

* cited by examiner

FIG. 3A

SYSTEMS AND METHODS FOR DIGITAL SHELF DISPLAY

CROSS-REFERENCE TO RELATED APPLICATIONS

This application claims the priority and benefit of U.S. Provisional Application No. 62/896,390, filed on Sep. 5, 2019, the entirety of which is incorporated herein by reference.

BACKGROUND

As more and more transactions take place online, merchants may take different approaches to drive sales on the digital shelf. For example, similar to physical retail stores, merchants or marketers may try to increase the visibility of their products to shopper by improving presence of their products on the digital shelf.

SUMMARY

The present disclosure provides methods and systems for quantitatively and qualitatively measuring the health of a brand or item(s) on a digital shelf. Methods and systems of the present disclosure may be capable of evaluating the performance of a brand or item(s) in an ecommerce channel in a quantitative manner by calculating a score standardized within an ecommerce platform (e.g., Amazon.com, Target.com, Walmart.com, etc), across different brands, merchants, vendors, commodities providers or other levels of electronic marketing. Methods and systems provided herein may be capable of dynamically generating a score for each individual brand or a given product. Methods and systems of the present disclosure may be implemented on or seamlessly integrated into a variety of platforms, including existing online retail platforms and/or online retail or ecommerce software/application.

In an aspect, a method is provided for quantifying performance of an item in a digital shelf. The method comprises: calculating a value associated with a shelf share of the item; determining a set of factors for calculating a score indicative of the performance of the item on the digital shelf, wherein the set of factors includes the shelf share; generating, using a trained machine learning algorithm, the score based on the set of factors; and displaying the score within a graphical user interface (GUI) on an electronic device.

In another related yet separate aspect, a non-transitory computer-readable medium comprising machine-executable instructions, that, upon execution by one or more computer processors, implements a method for quantifying performance of an item in a digital shelf is provided. The method comprises: calculating a value associated with a shelf share of the item; determining a set of factors for calculating a score indicative of the performance of the item on the digital shelf, wherein the set of factors includes the shelf share; generating, using a trained machine learning algorithm, the score based on the set of factors; and displaying the score within a graphical user interface (GUI) on an electronic device.

In some embodiments, the value associated with the shelf share is determined based on a plurality of measurable factors each associated with a weighting coefficient. In some cases, the weighting coefficient is determined based on one or more factors selected from the group consisting of context of a product category, marketplace, seasonality, geography, user device, and consumer experience. In some cases, the weighting coefficient is determined using a machine learning algorithm trained model.

In some embodiments the set of factors further comprise one or more factors selected from the group consisting of price, ratings, position within a catalog, and packaging quality. In some embodiments, generating the score comprises determining a set of weighting coefficients for the set of factors. In some cases, the set of weighting coefficients are determined based on one or more factors selected from the group consisting of context of a product category. In some cases, the set of weighting coefficients are determined using a machine learning algorithm trained model.

In some embodiments, the method further comprises generating a recommendation to improve the score, wherein the recommendation comprises one or more of the members selected from the group consisting of recommended keyword or search terms of the item, description of the item, presentation of the item in the digital shelf, and price. In some cases, the recommendation is generated using a machine learning algorithm trained model.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 3A shows an example of a GUI for requesting a digital shelf analytic result.

DETAILED DESCRIPTION

Figure 1:
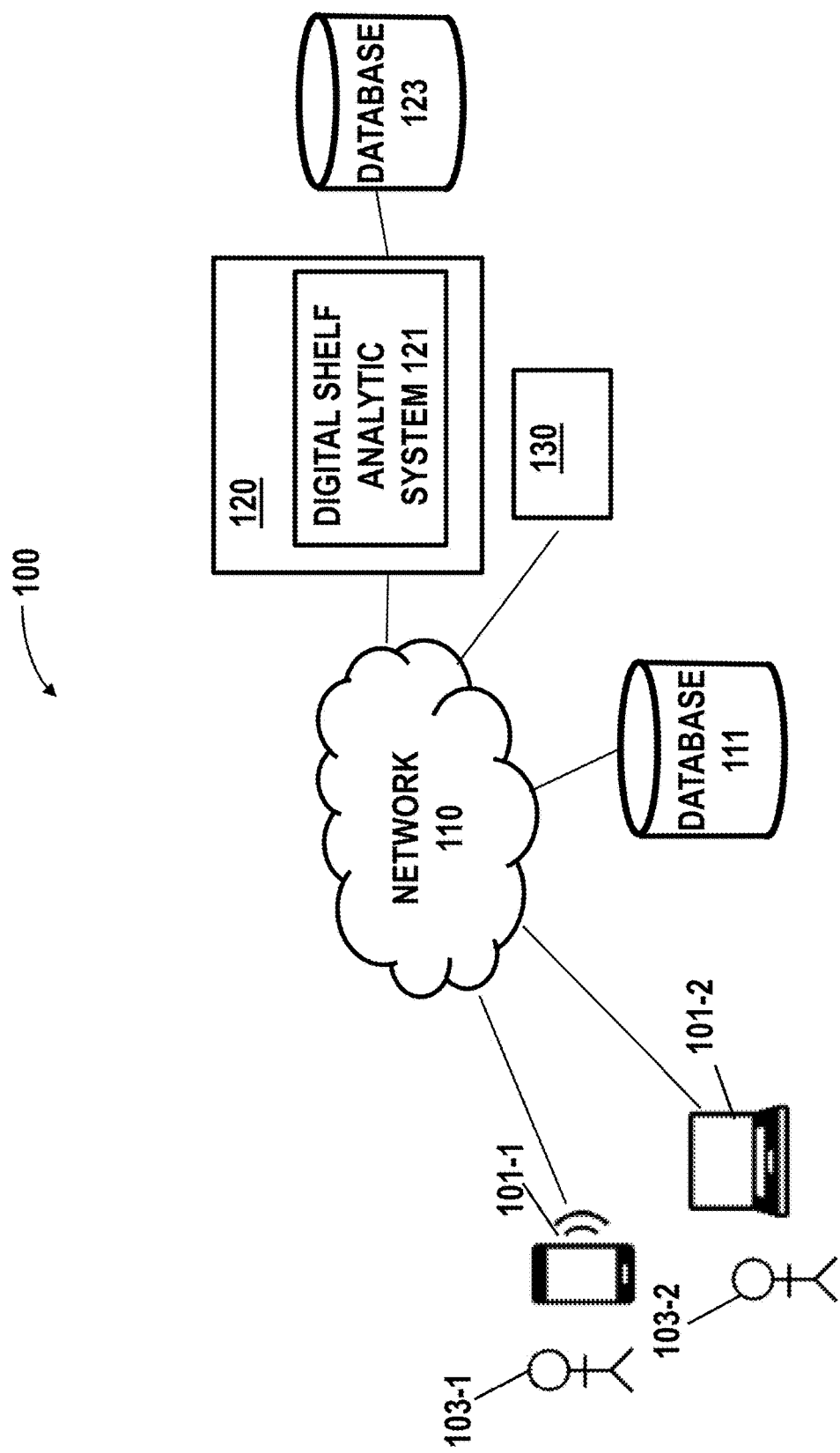
FIG. 1 schematically shows a platform in which the method and system for providing digital shelf analytics can be implemented.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The present disclosure provides systems and methods for measuring brand, product or commodity items performance on a digital shelf. A digital shelf may also be referred to as a digital shelf display which can be used interchangeably throughout the specification. The performance measurement may be used for generating recommendations for improving the performance in the ecommerce channel. The provided systems and methods may dynamically generate a score indicating the performance or health of items in an ecommerce channel or an online retail platform.

In some cases, the presence of the item(s) on the digital shelf may be enhanced by increasing the shelf share of the items. The term "shelf share" as used herein, generally refers to the visibility or discoverability of an item (e.g., product). On a digital shelf, shelf share may reflect the expressed consumer interest or intent. A shelf share may be a measure of the proportion of interest that is occupied or addressed by a given item, e.g., product. The present disclosure provides methods for quantifying the shelf share for a given item.

An item may be a product, products of a given brands, a brand, a store, or other items offered by a user in an ecommerce channel. A user may generally refer to an individual, a merchant, a marketer, an organization, a vendor, a service/product provider or other entities who offer items (e.g., products/services) or one or more brands through an ecommerce channel or via electronic marketplace that provide a common interface through which customers may search for the items and/or place orders.

Systems and methods of the present disclosure may utilize machine learning techniques (e.g., supervised learning, unsupervised learning or semi-supervised learning) for generating quantitative and qualitative analysis of items health on a digital shelf and/or generating recommendations for enhancing the health in an automated fashion. The provided methods and systems may be capable of accounting for the large volume of online transaction data, customer data, product data, competitor data and various other types of data involved in the ecommerce channel and accounting for the variability among different products, brands, and the fast changing in the marketplace. In some cases, the algorithm for calculating a score reflecting the product health may continually improve to provide personalized recommendations.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

As described above, the present disclosure may provide methods and systems for measuring a presence of an item on a digital shelf. In some cases, the shelf share of an item (e.g., product, products of a brand, etc) may be calculated. As described above, a shelf share may refer to the visibility or discoverability of an item (e.g., product). The shelf share may reflect the expressed consumer interest or intent. A shelf share may be a measure of the proportion of interest that is occupied or addressed by a single item, e.g., product, or a set of items made sold by the same brand. An interest or intent may be specific to a product (e.g., a brand), a category of product (e.g., laptop, camera, or baby stroller, etc), one or more specifications or properties of a product (e.g., price, specifications such as computing power of a laptop, etc) and the like. The provided methods may measure the interest or intent by defining the interest in one or more measurable factors. In some cases, the measurable factors may include, for example, the number of web searches consumers conducted for products similar to a given product, the size of network traffic came to a given online store from websites that are well-known to aggregate people interested in products similar to a given product, or the number of relevant advertising impressions that are targeted and shown to consumers through an ecommerce platform's own intent targeting algorithm.

The measurable factors may be pre-determined based on empirical data such as extracted from marketplace data. The measurable factors for calculating a shelf share may be fixed over time. Alternatively or in addition to, the measurable factors for calculating a shelf share may be dynamically selected.

Next, the shelf share for a given product may be computed as a proportion of interest that is occupied by a given product or brand. For example, the shelf share for a given product or brand may be calculated using below formula:

$$SS = \frac{(w_1 * i_1 + w_2 * i_2 + \ldots + w_n * i_n)}{(w_1 + w_2 + \ldots + w_n)}$$

Where $i_n$ represents the estimated number of viewable impressions that are delivered to consumers that contained product listings similar to the given product or given brand, and Wn represents the weight of a given channel with an ecommerce platform (e.g., Amazon search, Amazon browse similar items, Walmart search, Google search, etc). It should be noted that the abovementioned formula is for illustrative purpose only and is not intended to be in any way limiting. For example, the plurality of factors may be integrated and correlated in a variety of ways, such as linearly correlated or non-linearly correlated (e.g., exponential).

The weights may be determined based on a plurality of factors such as the context of different product categories, the marketplace, seasonality, geography, user device, consumer experience, and various other factors. For example, searching for sneakers on Google.com from a mobile device at 8 am during the morning bus ride may have a lower weight than the same search performed on Amazon.com at 9 pm from a home computer. The weights may be determined empirically such as based on historical data. The weight coefficients may be determined based on any suitable theory or any purposes. The weight coefficients may be determined based on handcrafted/predefined rules or using a machine learning algorithm trained model.

The present disclosure may provide methods and systems for measuring the health and overall potential of a given product or brand on a digital shelf. In some embodiments, the provided methods may calculate a score based at least in part on the shelf share of the product. The score may be calculated based on a plurality of factors including but not limited to, price, ratings/reviews, discoverability (e.g., shelf share), position within the catalog, packaging quality and others. In some cases, a score may be an overall score displayed with a plurality of compositions such as positioning, response, and/or presence. In some cases, each factor may be quantified individually and normalized according to the measure's rank within a population distribution. In some cases, the score may be calculated as a weighted average of the individual factor values. For example, the score for a brand in a category may be the weighted average of the scores of all the brand's products in the category. Below is an example of a formula for calculating a score:

$$GS = \frac{(w_1 * f_1 + w_2 * f_2 + \ldots + w_n * f_n)}{(w_1 + w_2 + \ldots + w_n)}$$

where $f_n$ represents the product factor score and $W_n$ represents the weighting coefficient. It should be noted that the above-mentioned formula is for illustrative purpose only and is not intended to be in any way limiting. For example, the plurality of factors may be integrated and correlated in a variety of ways, such as linearly correlated or non-linearly correlated (e.g., exponential).

The weighting coefficients may be determined based on a plurality of factors such as the context of different product categories, the marketplace conditions (e.g., seasonality, geography, etc), user device, consumer experience, and various other factors. The weighting coefficients may be determined dynamically and updated periodically.

In some embodiments, the provided digital shelf analytic system may provide a predictive model for recommendations to improve a score. In some cases, the weighting coefficients may be generated by the predictive model. In some cases, the score may be the output of the predictive model. A predictive model may be a trained model or machine learning algorithm trained model. The predictive model may be improved or optimized continuously using private data collected. In some cases, the input data to the predictive model may comprise data related to the various factors affecting the score as described above. In some cases, the input data may include user provided data related to a given product or brand (e.g., keyword/search terms for the product, product description, categories, images, etc). The input data may include raw data such as marketplace data that may be obtained automatically using techniques such as image recognition, parsing HTM, URL, watermark decoded from product image, image fingerprints, text fingerprints, cookie data, and the like. For example, Amazon pages for the most popular products or products in the same category may be crawled to independently compile data that cross-references Amazon ASINs to GTINs, manufacturers' model numbers, and other identifying data. In some cases, the input data may be retrieved from an external data source such as public and commercial brand database.

The output of the predictive model may comprise weights associated with a plurality of factors for calculating a score. Alternatively or in addition to, the output of the predictive model may comprise the score that is standardized within an ecommerce platform (e.g., Amazon.com, Target.com, Walmart.com, etc), across different online retail platforms or ecommerce channels, brands, merchants, vendors, commodities providers or other level of marketplace. The scores may be associated with measurement of the factors including at least the shelf share metric. In some cases, the scores may show users the product performance compared with the averages. For example, the score can be any number from 0 to 1000 with higher value indicating better health in the digital shelf and an overall healthier performance. For instance, a score of >700 might indicate world class performance, a score between 400 and 700 may indicate generally good performance with some tangible ways to be better and a score of below 400 may indicate the health in the digital shelf needs significant improvement. The score can be represented in any suitable format, such as, numerical and graphical, continuous or discrete level.

In some cases, the output of the predictive model may comprise recommendation information. The recommendation information may comprise information about improving the score. For example, the recommendation may comprise a recommended keyword/search terms of the product, description about the product, presentation of the product (e.g., image, video, etc), price, marketing strategy (e.g., paid presence), and the like. In some cases, the recommendations may be personalized so that one or more actions as recommended are executable to the user.

The term "labeled data" or "labeled dataset," as used herein, generally refers to a paired dataset used for training a model using supervised learning. Methods provided herein may utilize an un-paired training approach allowing a machine learning method to train and apply on existing datasets that may be available with an existing digital shelf or ecommerce channel.

The system may calculate a score which provides a simple and standardized way for users to view the health and overall performance of an item in a digital shelf. FIG. 1 schematically shows a platform 100 in which the method and system for providing digital shelf analytics can be implemented. A platform 100 may include one or more user devices 101-1, 101-2, a server 120, a digital shelf analytic system 121, one or more third-party systems 130 (e.g., online retail platforms), and a database 111, 123. Each of the components 101-1, 101-2, 111, 123, 120, 130 may be operatively connected to one another via a network 110 or any type of communication link that allows transmission of data from one component to another.

The digital shelf analytic system 121 may be configured to train one or more predictive models for analyzing input data (e.g., collected from the user device 101-1, 101-2, a third-party system 130, and/or data sources 111), calculate a score indicating the item's health and performance in the digital shelf, and/or provide recommendation information. As described above, recommendation information may comprise information about improving the score. For example, the recommendation may comprise a recommended keyword of the product, description about the product, marketing strategy (e.g., paid presence), and the like.

The digital shelf analytic system 121 may be configured to perform one or more operations consistent with the disclosed methods and algorithms described herein. In some cases, the digital shelf analytic system may be configured to calculate a shelf share for a given product or brand. In some cases, the digital shelf analytic system may be configured to calculate a score based on the shelf share of the given product along with other factors using an algorithm described elsewhere herein. The digital shelf analytic system may be implemented anywhere within the platform, and/or outside of the platform 100. In some embodiments, the digital shelf analytic system may be implemented on the server. In other embodiments, a portion of the digital shelf analytic system may be implemented on the user device. Additionally, a portion of the digital shelf analytic system may be implemented on the third-party system. Alternatively or in addition to, a portion of the digital shelf analytic system may be implemented in one or more databases 111, 123. The digital shelf analytic system may be implemented using software, hardware, or a combination of software and hardware in one or more of the above-mentioned components within the platform.

In some embodiments, a user 103-1, 103-2 may be associated with one or more user devices 101-1, 101-2. In some cases, a user may be an individual, a merchant, a marketer, an organization, a vendor, a service/product provider or other entities who offer items (e.g., products/services) or one or more brands through an ecommerce channel or via electronic marketplace (provided by the third party system 130). For example, a user 103-1 may offer good or products via an online retail software running on the user device 101-1. The online retail software may be provided by a third-party system 130. Alternatively, items offered by the user may be made discoverable in an ecommerce platform (e.g., Amazon.com, Target.com, Walmart.com, etc) provided by the third-party system. In some cases, a user may be presented the score, a report, and/or marketplace analytics related to the product via the user device. In some cases, a user may be prompted to provide user input for calculating the score or requesting an analytic report via a user interface (UI) provided by the digital shelf analytic system.

User device 101-1, 101-2 may be a computing device configured to perform one or more operations consistent with the disclosed embodiments. Examples of user devices may include, but are not limited to, mobile devices, smartphones/cellphones, tablets, personal digital assistants (PDAs), laptop or notebook computers, desktop computers, media content players, television sets, video gaming station/system, virtual reality systems, augmented reality systems, microphones, or any electronic device capable of analyzing, receiving (e.g., receiving user input data), providing or displaying certain types of data (e.g., score, recommendation, etc.) to a user. The user device may be a handheld object. The user device may be portable. The user device may be carried by a human user. In some cases, the user device may be located remotely from a human user, and the user can control the user device using wireless and/or wired communications. The user device can be any electronic device with a display.

User device 101-1, 101-2 may include one or more processors that are capable of executing non-transitory computer readable media that may provide instructions for one or more operations consistent with the disclosed embodiments. The user device may include one or more memory storage devices comprising non-transitory computer readable media including code, logic, or instructions for performing the one or more operations. The user device may include software applications (e.g., provided by third-party server 130) that allow the user to performance transaction or host an online store to offer products via the software application, and/or software applications provided by the digital shelf analytic system 121 that allow the user device to communicate with and transfer data between server 120, the digital shelf analytic system 121, and/or database 111.

The user device 101-1, 101-2 may include a communication unit, which may permit the communications with one or more other components in the platform 100. In some instances, the communication unit may include a single communication module, or multiple communication modules. In some instances, the user device may be capable of interacting with one or more components in the platform 100 using a single communication link or multiple different types of communication links.

User device 101-1, 101-2 may include a display. The display may be a screen. The display may or may not be a touchscreen. The display may be a light-emitting diode (LED) screen, OLED screen, liquid crystal display (LCD) screen, plasma screen, or any other type of screen. The display may be configured to show a user interface (UI) or a graphical user interface (GUI) rendered through an application (e.g., via an application programming interface (API) executed on the user device). The GUI may show score, recommendation and images, charts, interactive elements relating to a product or brand (e.g., product performance statistics, marketplace analytics, etc). The GUI may permit a user to input data about a given product or brand (e.g., enter product title, keyword, etc). The user device may also be configured to display webpages and/or websites on the Internet. One or more of the webpages/websites may be hosted by server 120 and/or rendered by the digital shelf analytic system 121.

In some embodiments, users may utilize the user devices to interact with the digital shelf analytic system 121 by way of one or more software applications (i.e., client software) running on and/or accessed by the user devices, wherein the user devices and the digital shelf analytic system 121 may form a client-server relationship. For example, the user devices may run dedicated mobile applications or software applications for viewing product health assessment (e.g., score, marketplace statistics, competitor information, new entrants in a related category, etc) and recommendation provided by the digital shelf analytic system. The software applications for conducting an online transaction and viewing assessment of the product/brand may be different applications. The digital shelf analytic system may deliver information and content to the user devices 103 related to a digital shelf analytic result (e.g., a report, a score, recommendations and marketplace statistics) and various others, for example, by way of one or more web pages or pages/views of a mobile application. Alternatively or in addition to, the assessment and recommendation provided by the digital shelf analytic system may be integrated into a third-party user interface such as APIs integrated to an existing software application such that the score, recommendation, analytics data may be displayed within a GUI rendered by the third-party system 130. The third-party user interfaces may be hosted by a third-party server. Alternatively or in addition to, the assessment and recommendations provided by the digital shelf analytic system may be provided as a standalone software application or can be accessed independent of the third-party software application.

In some embodiments, the provided platform may generate one or more graphical user interfaces (GUIs). The GUIs may be rendered on a display screen on a user device. A GUI is a type of interface that allows users to interact with electronic devices through graphical icons and visual indicators such as secondary notation, as opposed to text-based interfaces, typed command labels or text navigation. The actions in a GUI are usually performed through direct manipulation of the graphical elements. In addition to computers, GUIs can be found in hand-held devices such as MP3 players, portable media players, gaming devices and smaller household, office and industry equipment. The GUIs may be provided in software, a software application, a mobile application, a web browser, or the like. The GUIs may be displayed on a user device (e.g., desktop computers, laptops or notebook computers, mobile devices (e.g., smart phones, cell phones, personal digital assistants (PDAs), and tablets), and wearable devices (e.g., smartwatches, etc)).

Server 120 may be one or more server computers configured to perform one or more operations consistent with the disclosed embodiments. In one aspect, the server may be implemented as a single computer, through which user device, third-party system 130 are able to communicate with the digital shelf analytic system 121 and database. In some embodiments, the user device or third-party system 130 may communicate with the digital shelf analytic system 121 directly through the network. In some embodiments, the server may embody the functionality of one or more of the digital shelf analytic systems. In some embodiments, one or more digital shelf analytic systems may be implemented inside and/or outside of the server. For example, the digital shelf analytic systems may be software and/or hardware components included with the server or remote from the server.

The third-party system 130 can be any existing platform that provides an ecommerce channel or ecommerce platform for transactions taking place or displaying products on a digital shelf. In some cases, the third-party system may be in direct communication with the digital shelf analytic system such that the data collected by the third-party system may be accessible to the digital shelf analytic system for product health assessment.

In some embodiments, the user device, third-party system may be directly connected to the server 120 through a separate link (not shown in FIG. 1). In certain embodiments, the server 120 may be configured to operate as a front-end device configured to provide access to the digital shelf analytic system consistent with certain disclosed embodiments. The server may, in some embodiments, host one or more digital shelf analytic system to process data transmitted from the user device, crawled from public or marketplace websites, retrieved from external databases or the third-party system in order to train a predictive model, perform continual training of a predictive model, deploy the predictive model, and implement the predictive model for generating, a score, intermediary results (e.g., weighting coefficients) for calculating a score, and/or recommendations. The server may also be configured to store, search, retrieve, and/or analyze data and information stored in one or more of the databases. The data and information may include data transmitted from the user device, crawled from public or marketplace websites, retrieved from external databases or the third-party system, as well as data about a predictive model (e.g., parameters, model architecture, training dataset, performance metrics, threshold, etc), data generated by a predictive model such as the shelf share value, the score, intermediary results (e.g., weighting coefficients, one or more factors) for calculating a score, or recommendations and the like. While FIG. 1 illustrates the server as a single server, in some embodiments, multiple devices may implement the functionality associated with a server.

A server may include a web server, an enterprise server, or any other type of computer server, and can be computer programmed to accept requests (e.g., HTTP, or other protocols that can initiate data transmission) from a computing device (e.g., user device, third party system, etc) and to serve the computing device with requested data. In addition, a server can be a broadcasting facility, such as free-to-air, cable, satellite, and other broadcasting facility, for distributing data. A server may also be a server in a data network (e.g., a cloud computing network).

A server may include known computing components, such as one or more processors, one or more memory devices storing software instructions executed by the processor(s), and data. A server can have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods can be implemented in hardware components or combinations of hardware and software such as, for example, ASICs, special purpose computers, or general purpose computers.

Network 110 may be a network that is configured to provide communication between the various components illustrated in FIG. 1. The network may be implemented, in some embodiments, as one or more networks that connect devices and/or components in the network layout for allowing communication between them. For example, user device 101-1, 101-2, third-party system 130, server 120, digital shelf analytic system 121, and database 111, 123 may be in operable communication with one another over network 110. Direct communications may be provided between two or more of the above components. The direct communications may occur without requiring any intermediary device or network. Indirect communications may be provided between two or more of the above components. The indirect communications may occur with aid of one or more intermediary device or network. For instance, indirect communications may utilize a telecommunications network. Indirect communications may be performed with aid of one or more router, communication tower, satellite, or any other intermediary device or network. Examples of types of communications may include, but are not limited to: communications via the Internet, Local Area Networks (LANs), Wide Area Networks (WANs), Bluetooth, Near Field Communication (NFC) technologies, networks based on mobile data protocols such as General Packet Radio Services (GPRS), GSM, Enhanced Data GSM Environment (EDGE), 3G, 4G, 5G or Long Term Evolution (LTE) protocols, Infra-Red (IR) communication technologies, and/or Wi-Fi, and may be wireless, wired, or a combination thereof. In some embodiments, the network may be implemented using cell and/or pager networks, satellite, licensed radio, or a combination of licensed and unlicensed radio. The network may be wireless, wired, or a combination thereof.

User device 101-1, 101-2, third-party system 130, server 120, or digital shelf analytic system 121, may be connected or interconnected to one or more database 111, 123. The databases may be one or more memory devices configured to store data. Additionally, the databases may also, in some embodiments, be implemented as a computer system with a storage device. In one aspect, the databases may be used by components of the network layout to perform one or more operations consistent with the disclosed embodiments. One or more local databases, and cloud databases of the platform may utilize any suitable database techniques. For instance, structured query language (SQL) or "NoSQL" database may be utilized for storing the marketplace analytics data (e.g., factors extracted from the marketplace data, etc), historical data (e.g., scores, report, analytic result, etc), predictive model or algorithms. Some of the databases may be implemented using various standard data-structures, such as an array, hash, (linked) list, struct, structured text file (e.g., XML), table, JavaScript Object Notation (JSON), NOSQL and/or the like. Such data-structures may be stored in memory and/or in (structured) files. In another alternative, an object-oriented database may be used. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. In some embodiments, the database may include a graph database that uses graph structures for semantic queries with nodes, edges and properties to represent and store data. If the database of the present invention is implemented as a data-structure, the use of the database of the present invention may be integrated into another component such as the component of the present invention. Also, the database may be implemented as a mix of data structures, objects, and relational structures. Databases may be consolidated and/or distributed in variations through standard data processing techniques. Portions of databases, e.g., tables, may be exported and/or imported and thus decentralized and/or integrated.

In some embodiments, the platform 100 may construct the database for fast and efficient data retrieval, query and delivery. For example, the digital shelf analytic system 121 may provide customized algorithms to extract, transform, and load (ETL) the data. In some embodiments, the digital shelf analytic system 121 may construct the databases using proprietary database architecture or data structures to provide an efficient database model that is adapted to large scale databases, is easily scalable, is efficient in query and data retrieval, or has reduced memory requirements in comparison to using other data structures.

In some embodiments, one or more of the databases may be co-located with the server, may be co-located with one another on the network, or may be located separately from other devices. One of ordinary skill will recognize that the disclosed embodiments are not limited to the configuration and/or arrangement of the database(s).

Although particular computing devices are illustrated and networks described, it is to be appreciated and understood that other computing devices and networks can be utilized without departing from the spirit and scope of the embodiments described herein. In addition, one or more components of the network layout may be interconnected in a variety of ways, and may in some embodiments be directly connected to, co-located with, or remote from one another, as one of ordinary skill will appreciate.

A server 120 may access and execute the digital shelf analytic system 121 to perform one or more processes consistent with the disclosed embodiments. In certain configurations, the digital shelf analytic system may be software stored in memory accessible by a server (e.g., in memory local to the server or remote memory accessible over a communication link, such as the network). Thus, in certain aspects, the digital shelf analytic system(s) may be implemented as one or more computers, as software stored on a memory device accessible by the server, or a combination thereof. For example, one digital shelf analytic system(s) may be a computer executing one or more algorithms for pre-training a predictive model, and another digital shelf analytic system may be software that, when executed by a server, generating scores or recommendations using the trained predictive model.

The digital shelf analytic system 121 though is shown to be hosted on the server 120. The digital shelf analytic system 121 may be implemented as a hardware accelerator, software executable by a processor and various others. In some embodiments, the digital shelf analytic system 121 may employ an edge intelligence paradigm that data processing and prediction is performed at the edge or edge gateway. In some cases, a predictive model for generating a score and/or recommendations may be built, developed and trained on the cloud/data center 120 and run on the user device and/or other devices local to the third-party system (e.g., hardware accelerator) for inference. For example, the predictive model for generating a score and/or recommendations may be pre-trained on the cloud and transmitted to the user device or third-party system for implementation. In some cases, the predictive model may go through continual training as new data and user input are collected. The continual training may be performed on the cloud or on the server 120. In some cases, data may be transmitted to the remote server 120 which are used to update the model for continual training and the updated model (e.g., parameters of the model that are updated) may be downloaded to the user device, software application of the third-party system for implementation.

The various functions performed by the client terminal and/or the digital shelf analytic system such as data processing, extracting factors from raw data, determining weighting coefficients, calculating a product health score, training a predictive model, executing a trained model, continual training a predictive model and the like may be implemented in software, hardware, firmware, embedded hardware, standalone hardware, application specific-hardware, or any combination of these. The digital shelf analytic system and techniques described herein may be realized in digital electronic circuitry, integrated circuitry, specially designed ASICs (application specific integrated circuits), computer hardware, firmware, software, and/or combinations thereof. These systems, devices, and techniques may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, and/or device (such as magnetic discs, optical disks, memory, or Programmable Logic Devices (PLDs)) used to provide machine instructions and/or data to a programmable processor.

Figure 2:
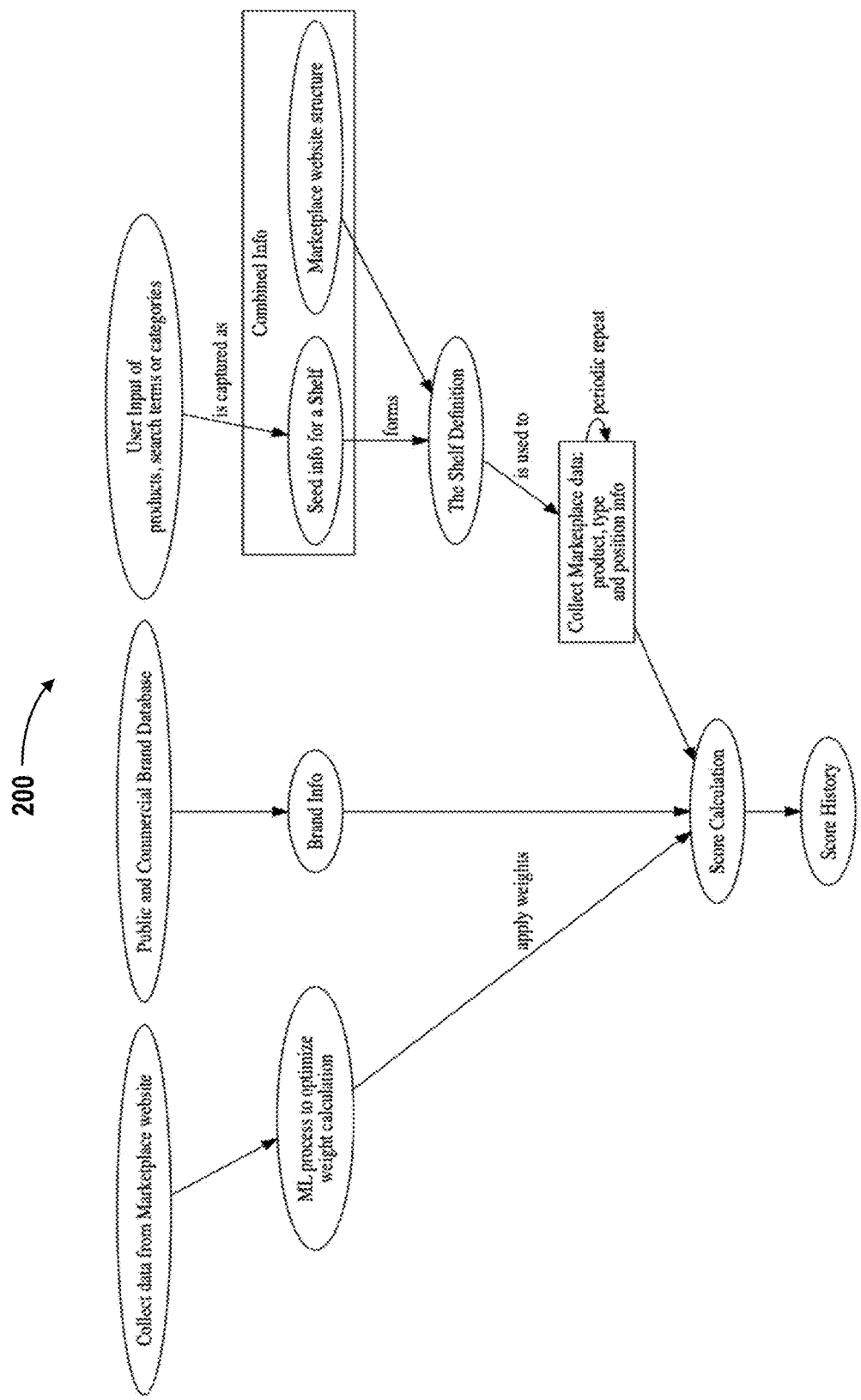
FIG. 2 shows an example of a method for generating a product health score, in accordance with some embodiments of the invention.

FIG. 2 shows an example of a method 200 for generating a product health score, in accordance with some embodiments of the invention. In some cases, data from marketplace website (e.g., descriptors, categories of items, characteristics of items such as sizes, colors, quality descriptors, other information associated with one or more items for sale) may be collected and processed for extracting one or more factors (e.g., price, ratings/reviews, discoverability, shelf share, position with the catalog, and packaging quality). In some cases, one or more weighting coefficients associated with the one or more factors may be determined by a trained model. In some cases, brand information may be obtained from public and commercial brand database. For example, the brand information may be retrieved from one or more content stores, images, identifiers of one or more persons, designers, places, things, items, events, accessory brands, item descriptors, narratives and/or other information associated with the same.

In some cases, user input data such as information about the products, search terms/keywords, or categories may be captured. In some cases, a user may provide an address to the online product via a GUI and information about the product (e.g., descriptors, categories of items, characteristics of items (e.g., sizes, colors, quality descriptors, etc) may be captured automatically. In some cases, the user input data may be combined with other factors extracted from the marketplace data for calculating the values for the factors (e.g., price, ratings/reviews, shelf shares, position with the catalog, and packaging quality). In some cases, data related to a digital shelf of the given product may be determined based on the user input data and such data may be used to collect the marketplace data. The multiple factors and the associated weights may then be used to calculate a score.

As described above, machine learning algorithm may be used to generate weighting coefficients or the score. The machine learning algorithm can be any type of machine learning network such as a neural network. Examples of neural networks include a deep neural network, a convolutional neural network (CNN), and a recurrent neural network (RNN). The machine learning algorithm may comprise one or more of the following: a support vector machine (SVM), a naïve Bayes classification, a linear regression model, a quantile regression model, a logistic regression model, a random forest, a neural network, CNN, RNN, a gradient-boosted classifier or repressor, or another supervised or unsupervised machine learning algorithm (e.g., generative adversarial network (GAN), Cycle-GAN, etc).

In some cases, the predictive model may be continually trained and improved using proprietary data or relevant data (e.g., user provided data, new data collected from ecommerce channels) so that the output can be better adapted to the specific product, ecommerce channel or a brand. In some cases, a predictive model may be pre-trained and implemented on the existing ecommerce system, and the pre-trained model may undergo continual re-training that involves continual tuning of the predictive model or a component of the predictive model (e.g., classifier) to adapt to changes in the implementation environment over time (e.g., changes in the marketplace data, model performance, user-specific data, etc).

In some cases, the model network for generating a score and/or recommendations may be obtained using supervised learning methods that require labeled datasets. In some cases, labeled datasets (e.g., score, recommendation) may be retrieved from a database, external data sources, or provided by one or more users. In some cases, the labeled data may be calculated based on existing data using a known formula.

In some cases, the process of training a predictive model may employ unsupervised training or semi-supervised training. For example, the training process may comprise extracting unsupervised features from marketplace data. For example, the model network for pre-processing the input data (e.g., marketplace data) for feature extraction may comprise an autoencoder. During the feature extraction operation, the autoencoder may be used to learn a representation of the input data for dimensionality reduction or feature learning. The autoencoder can have any suitable architecture such as a classical neural network model (e.g., sparse autoencoder, denoising autoencoder, contractive autoencoder) or variational autoencoder (e.g., Generative Adversarial Networks). In some embodiments, a sparse autoencoder with an RNN (recurrent neural network) architecture, such as LSTM (long-short-term memory) network, may be trained to regenerate the inputs for dimensionality reduction. For example, an encoder-decoder LSTM model with encoder and decoder layers may be used to recreate a low-dimensional representation of the input data to the following model training despite a latent/hidden layer.

FIG. 3 shows an example of a GUI for requesting a digital shelf analytic result. The GUI may be rendered on a user device. A user may provide user input comprising data about a product (e.g., Coleman Sundome Tent) via any suitable form (e.g., input a link to the website) for generating a score. In some cases, upon receiving the user input data and the request for generating a digital shelf analytic report, information about the product or brand (e.g., descriptors, categories of items, characteristics of items such as sizes, colors, quality descriptors, information associated with one or more similar items for sale, etc) may be retrieved and an analytic report may be generated.

Figure 3B:
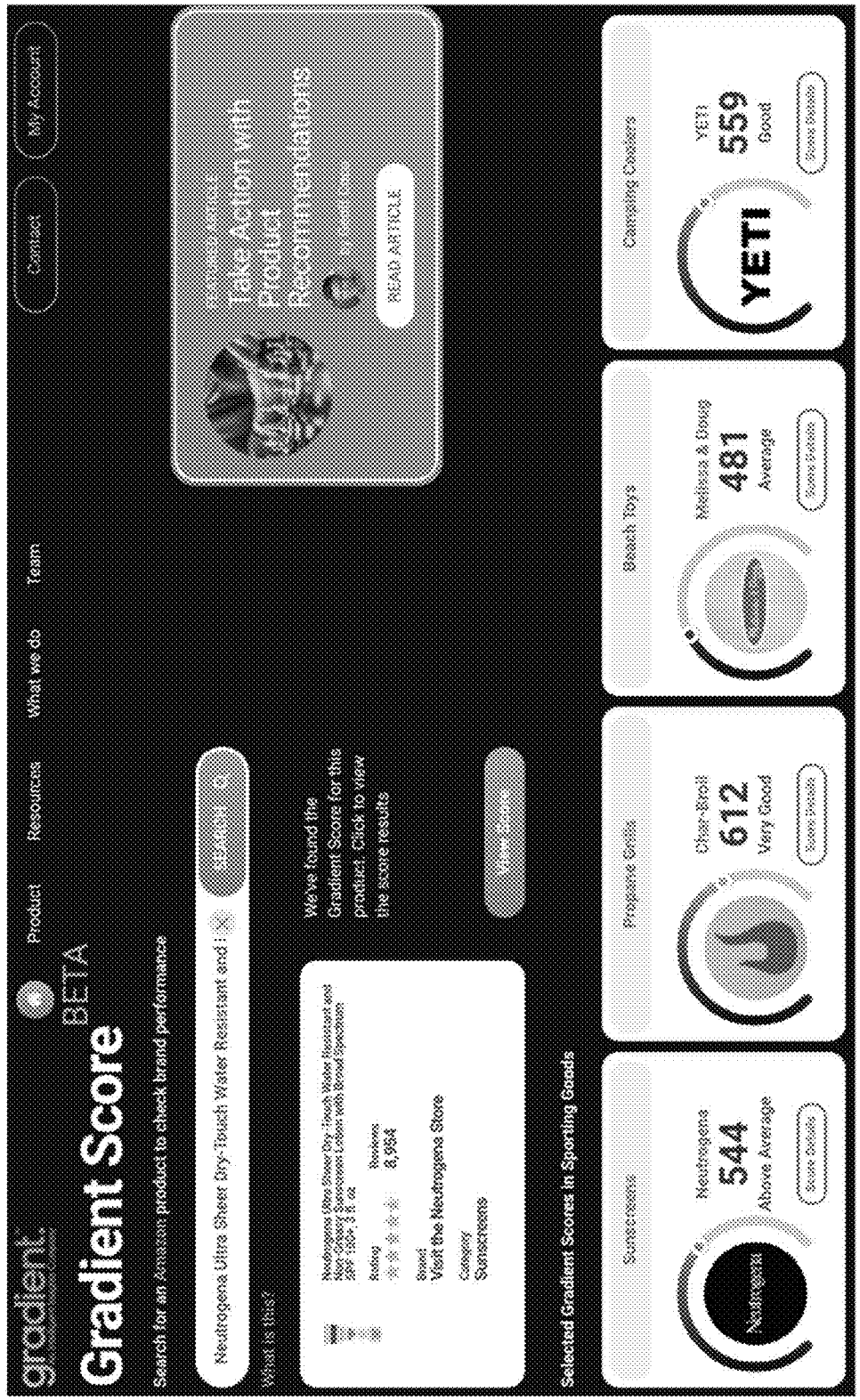
FIG. 3B shows an example of input in the GUI for retrieving a score.

FIG. 3B shows an example of input in the GUI for retrieving a score. In the illustrated example, upon receiving an input indicative of a name of the product or a brand (e.g., input in the search tool bar), a score may be returned instantly.

Figure 4:
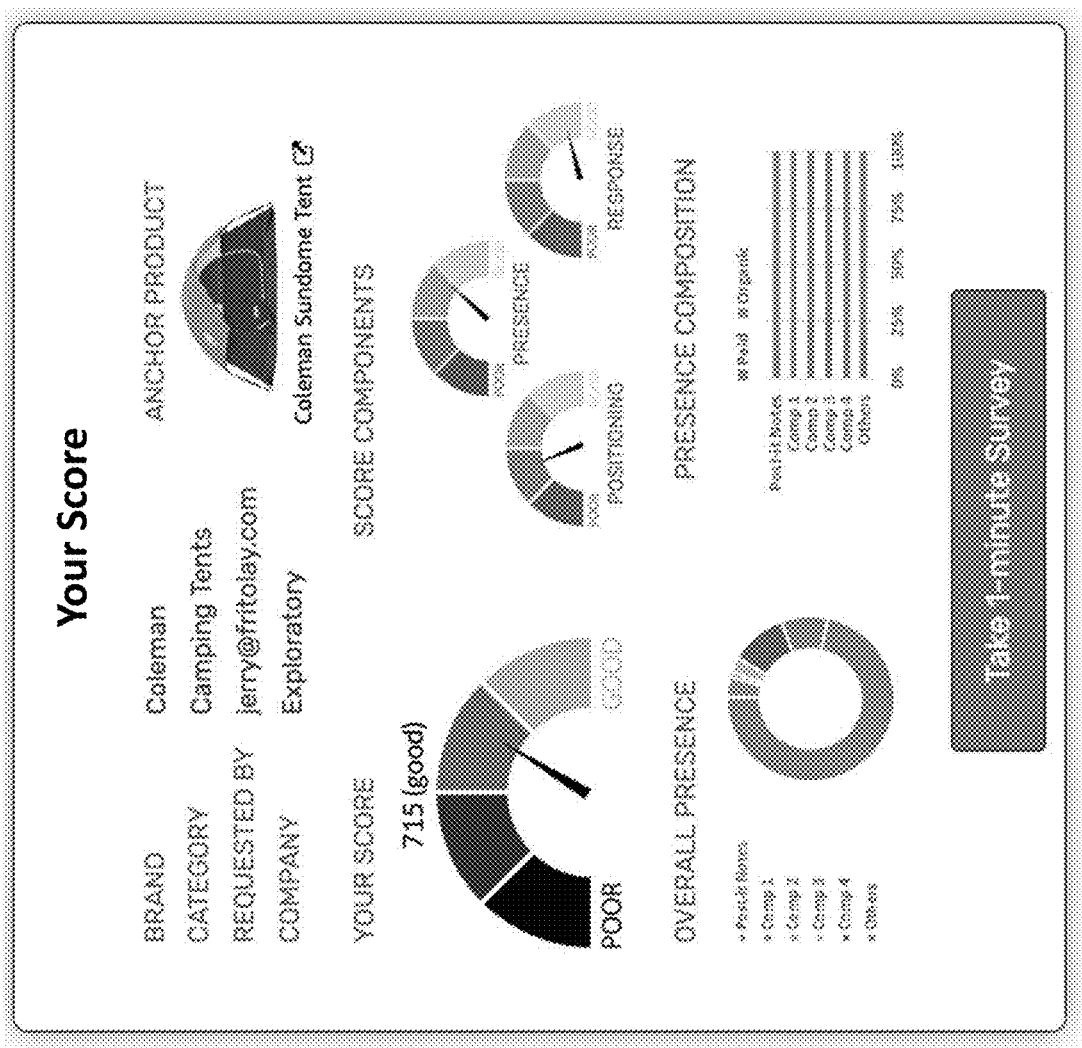
FIG. 4 shows an example of a GUI for presenting digital shelf analytic result.

FIG. 4 shows an example of a GUI for presenting digital shelf analytic result. The GUI may be rendered on a user device. In the illustrated example, a report may be generated which may comprise a product health score. The product health score may be presented in the scale of 0 to 1000 that is displayed in a dashboard region within the GUI. In some cases, the report may comprise statistics about the overall presence on the digital shelf, and score components such as positioning, response, and/or presence. The plurality of components may be presented in any suitable format such as a scale from poor to good. In some cases, analytics about the marketing strategy such as presence composition (e.g., percentage of paid presence or organic presence) may be displayed. The statistics may be associated with a product and/or a brand. A user may interact with the GUI through direct touch on a screen or IO devices such as handheld controller, mouse, joystick, keyboard, trackball, touchpad, button, verbal commands, gesture-recognition, attitude sensor, thermal sensor, touch-capacitive sensors, or any other device. The GUI may enable a user to interact with systems of the disclosure, such as for visualizing a score and/or digital shelf statistics.

The digital shelf analytic report may be generated and delivered to a user via the graphical user interface (GUI) or webhooks that can be integrated into other applications. The digital shelf analytic report can be provided via any suitable communication channels such as email, Slack, SMS the like.

Figure 5:
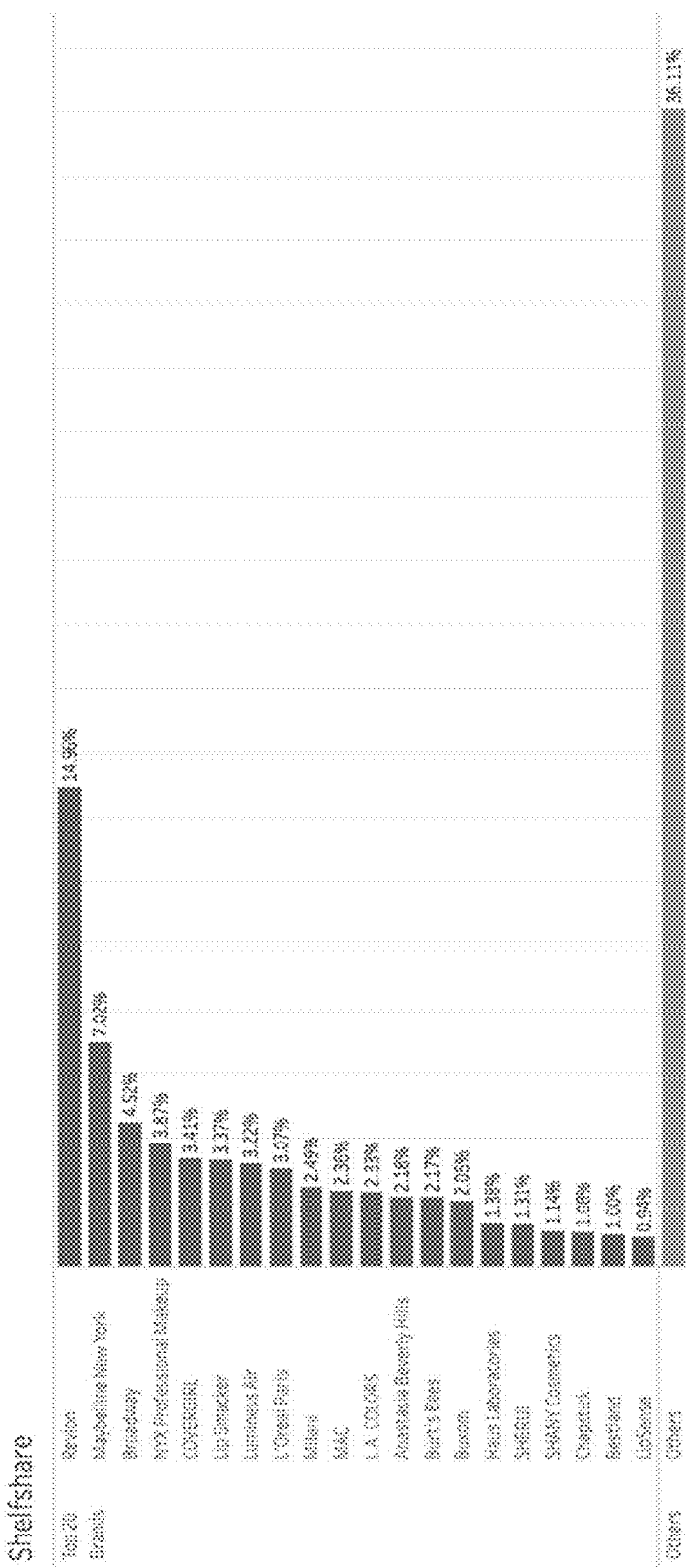
FIG. 5 shows an example of a GUI for presenting analytics about shelf share.

FIG. 5 shows an example of a GUI for presenting analytics about shelf share. The GUI may be rendered on a user device. In some cases, analytics about the shelf share in a selected category, an ecommerce channel, a given online marketplace may be generated and displayed to a user.

Figure 6:
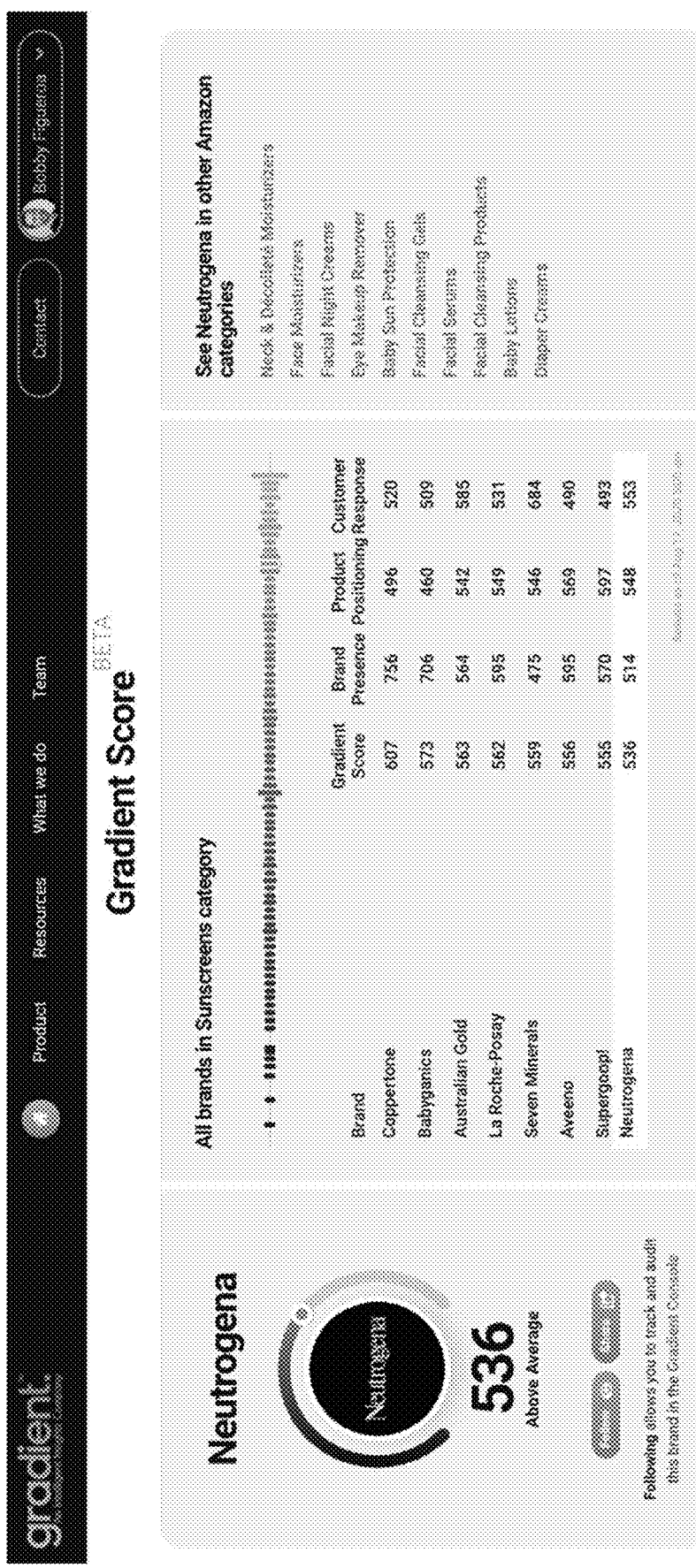
FIG. 6 shows an example of results of a Score for a brands and its competitors in a category.
Figure 7:
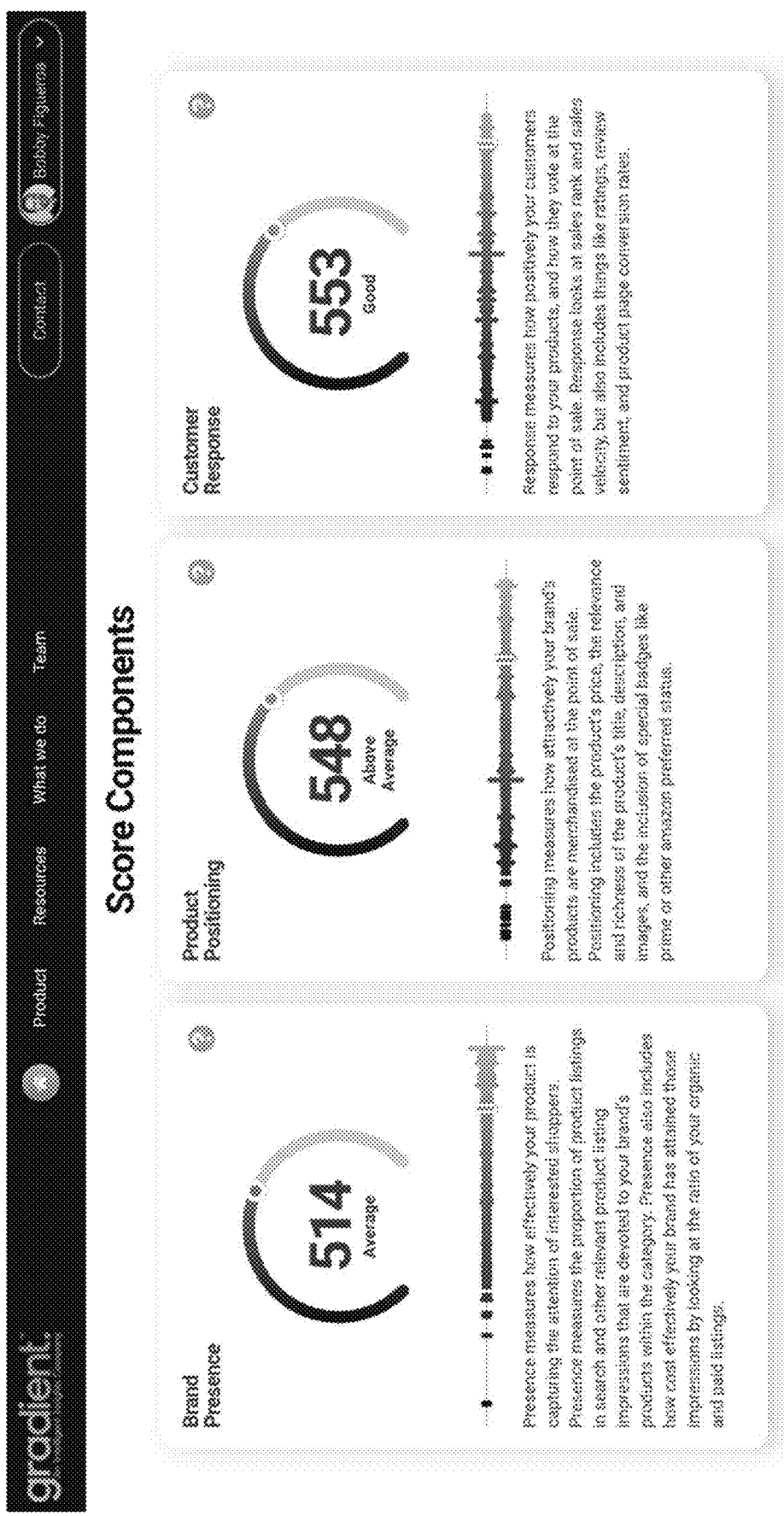
FIG. 7 shows an example of the subcomponents of the score for a brand.
Figure 8:
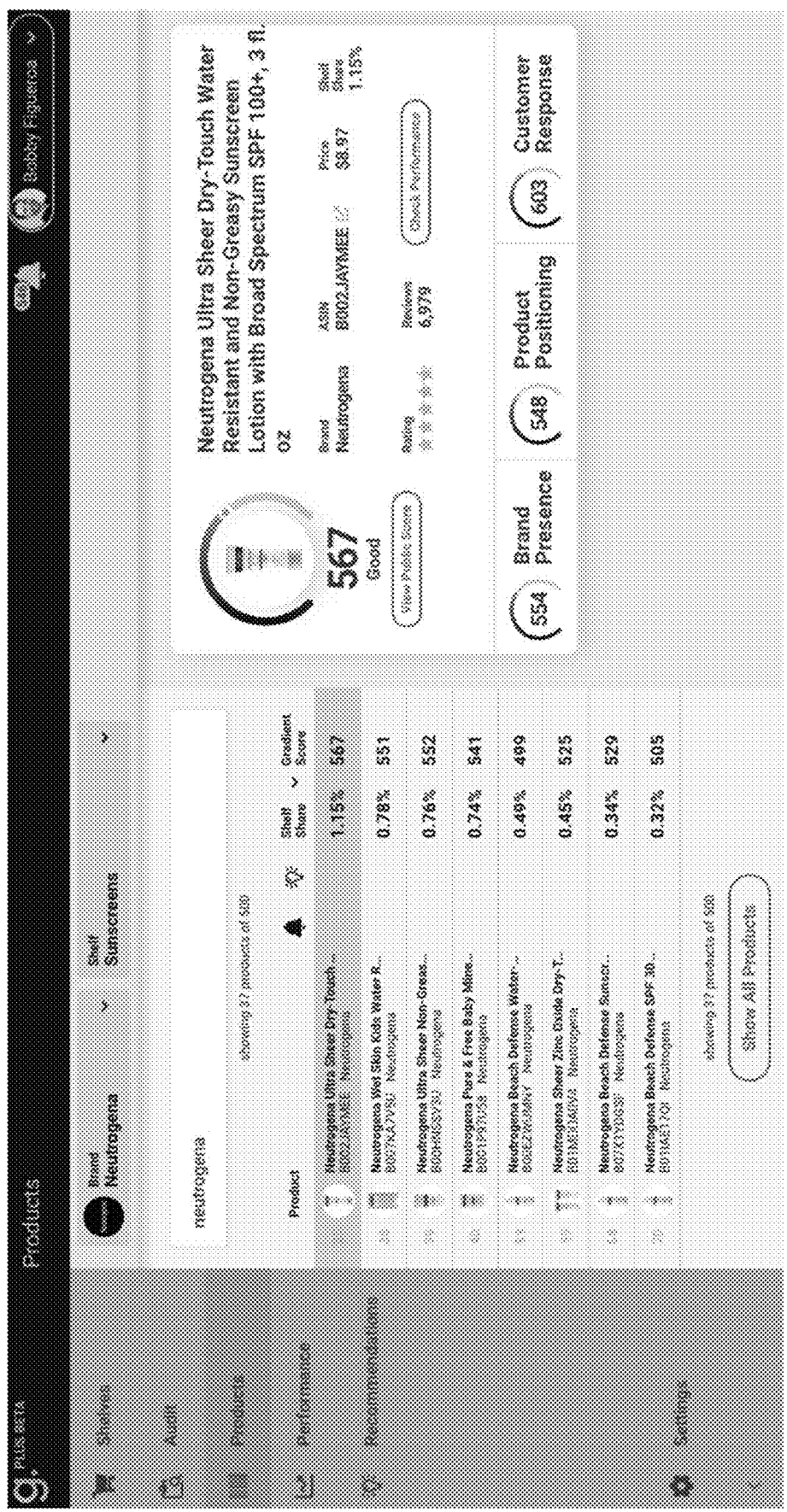
FIG. 8 shows an example of a score and its subcomponents for an individual product.
Figure 9:
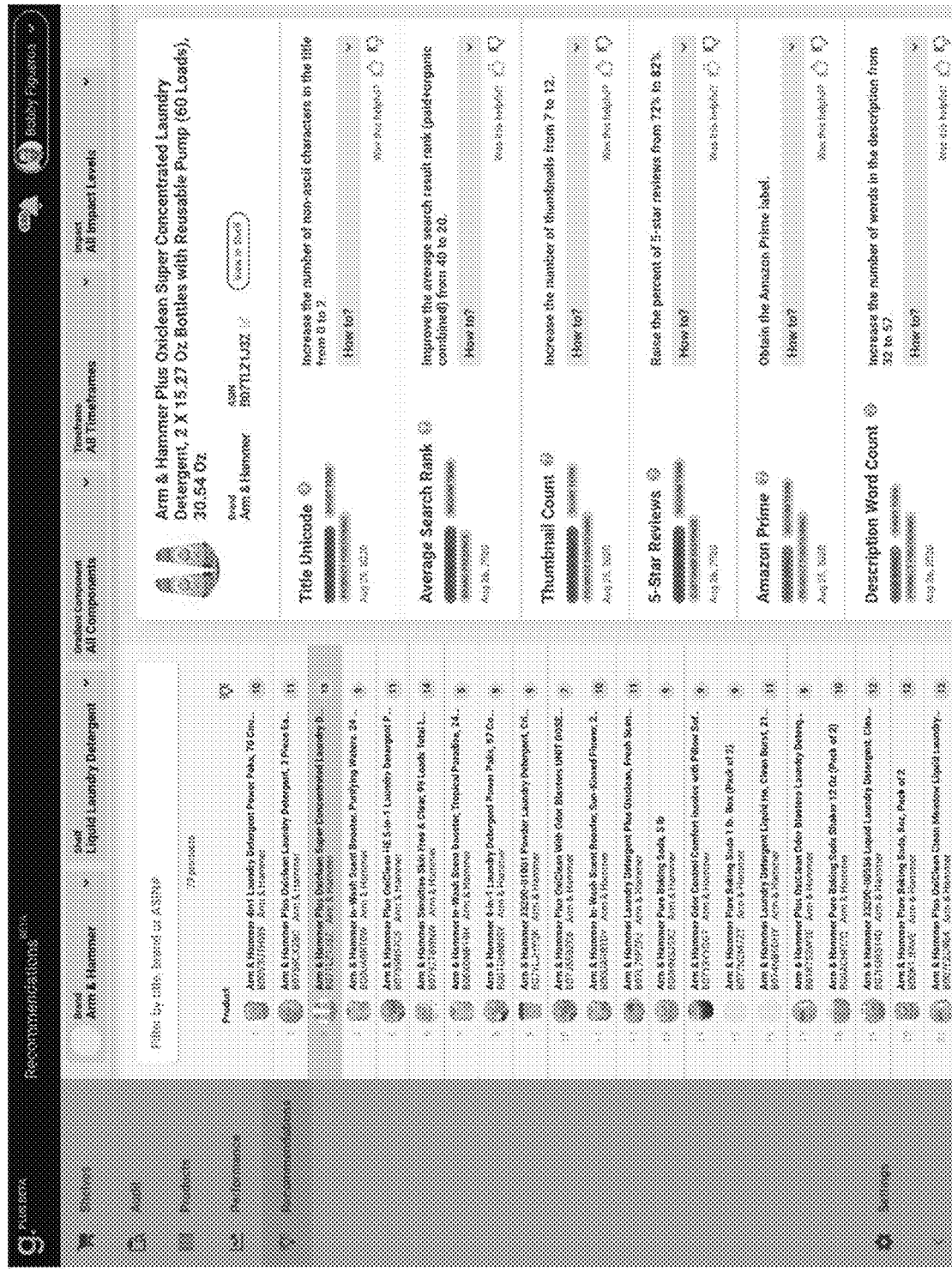
FIG. 9 shows an example of automated recommendations for a product as generated by the machine learning models.

FIG. 6 shows an example of results of a score for a brand and its competitors in a category. FIG. 7 shows an example of the subcomponents of the score for a brand. FIG. 8 shows an example of a score and its subcomponents for an individual product. FIG. 9 shows an example of automated recommendations for a product as generated by the machine learning models.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for quantifying performance of an item in a digital shelf comprising:
   (a) receiving, via a graphical user interface (GUI), a user input comprising information about the item on the digital shelf provided via an online platform;
   (b) calculating a value of a shelf share of the item provided via the online platform, wherein the value of the shelf share measures a proportion of interest occupied by the item and wherein the proportion of interest is calculated based at least in part on searches conducted for the item and searches conducted for a similar item within the online platform or across one or more other online platforms;
   (c) calculating a composite score indicative of the performance of the item on the digital shelf, wherein the composite score is calculated based on a set of factor scores and a set of corresponding coefficients, wherein the set of factor scores includes the value of the shelf share calculated in (b);
   (d) training a first model using machine learning algorithm for predicting at least one of the set of coefficients in (c), wherein the first model is continuously trained using (i) newly acquired data and (ii) a model performance of a classifier of the first model for predicting the at least one of the set of coefficients in (c); and
   (e) displaying the composite score along with one or more score components within the GUI on an electronic device.

2. The method of claim 1, wherein the value of the shelf share is determined based on a plurality of measurable factors each associated with a weighting coefficient.

3. The method of claim 2, wherein the weighting coefficient is determined based on one or more factors selected from the group consisting of context of a product category, marketplace, seasonality, geography, user device, and consumer experience.

4. The method of claim 1, wherein the set of factor scores are associated with a set of factors comprising one or more factors selected from the group consisting of price, ratings, position within a catalog, and packaging quality.

5. The method of claim 1, wherein the one or more score components comprise one or more of the set of factor scores in (c).

6. The method of claim 1, wherein the set of coefficients are determined based on one or more members selected from the group consisting of context of a product category, marketplace, seasonality, geography, user device, and consumer experience.

7. The method of claim 1, wherein the first model is continuously trained using data newly collected from the online platform.

8. The method of claim 1, further comprising generating a recommendation to improve the composite score, wherein the recommendation comprises one or more of the members selected from the group consisting of recommended keyword or search terms of the item, description of the item, presentation of the item in the digital shelf, and price.

9. The method of claim 8, wherein the recommendation is an output of a second model trained using a machine learning algorithm.

10. The method of claim 1, wherein the composite score is standardized at a selected level.

11. A non-transitory computer-readable medium comprising machine-executable instructions, that, upon execution by one or more computer processors, implements a method for quantifying performance of an item in a digital shelf, the method comprising:
    (a) receiving, via a graphical user interface (GUI), a user input comprising information about the item on the digital shelf provided via an online platform;
    (b) calculating a value of a shelf share of the item provided via the online platform, wherein the value of the shelf share measures a proportion of interest occupied by the item and wherein the proportion of interest is calculated based at least in part on searches conducted for the item and searches conducted for a similar item within the online platform or across one or more other online platforms;
    (c) calculating a composite score indicative of the performance of the item on the digital shelf, wherein the composite score is calculated based on a set of factor scores and a set of corresponding coefficients, wherein the set of factor scores includes the value of the shelf share calculated in (b);
    (d) training a first model using machine learning algorithm for predicting at least one of the set of coefficients in (c), wherein the first model is continuously trained using (i) newly acquired data and (ii) a model performance of a classifier of the first model for predicting the at least one of the set of coefficients in (c); and
    (e) displaying the composite score along with one or more score components within the GUI on an electronic device.

12. The non-transitory computer-readable medium of claim 11, wherein the value of the shelf share is calculated based on a plurality of measurable factors, each of which is associated with a weighting coefficient.

13. The non-transitory computer-readable medium of claim 12, wherein the weighting coefficient is determined based on one or more factors selected from the group consisting of context of a product category, marketplace, seasonality, geography, user device, and consumer experience.

14. The non-transitory computer-readable medium of claim 11, wherein the set of factor scores are associated with a set of factors comprising one or more factors selected from the group consisting of price, ratings, position within a catalog, and packaging quality.

15. The non-transitory computer-readable medium of claim 11, wherein the one or more score components comprise one or more of the set of factor score in (c).

16. The non-transitory computer-readable medium of claim 11, wherein the set of coefficients are determined based on one or more members selected from the group consisting of context of a product category, marketplace, seasonality, geography, user device, and consumer experience.

17. The non-transitory computer-readable medium of claim 11, wherein the first model is continuously trained using data newly collected from the online platform.

18. The non-transitory computer-readable medium of claim 11, wherein the method further comprises generating a recommendation to improve the composite score, wherein the recommendation comprises one or more of the members selected from the group consisting of recommended keyword or search terms of the item, description of the item, presentation of the item in the digital shelf, and price.

19. The non-transitory computer-readable medium of claim 18, wherein the recommendation is an output of a second model trained using a machine learning algorithm.

20. The non-transitory computer-readable medium of claim 11, wherein the composite score is standardized at a selected level.

\* \* \* \* \*